(12) United States Patent
Agarwal et al.

(10) Patent No.: US 8,166,004 B2
(45) Date of Patent: Apr. 24, 2012

(54) VERIFYING DATA CONSISTENCY AMONG STRUCTURED FILES

(75) Inventors: Ankit Agarwal, Bethesda, MD (US); Mahesh Lavannis, Rockville, MD (US); Pradeep K. Singh, Arlington, VA (US)

(73) Assignee: OPNET Technologies, Inc., Bethesda, MD (US)

( * ) Notice: Subject to any disclaimer, the term of this patent is extended or adjusted under 35 U.S.C. 154(b) by 593 days.

(21) Appl. No.: 12/176,317

(22) Filed: Jul. 18, 2008

(65) Prior Publication Data

US 2009/0055416 A1 Feb. 26, 2009

Related U.S. Application Data

(60) Provisional application No. 60/968,013, filed on Aug. 24, 2007.

(51) Int. Cl.
*G06F 17/00* (2006.01)
(52) U.S. Cl. ......................... 707/695; 707/690
(58) Field of Classification Search ............. 707/690, 707/695
See application file for complete search history.

(56) References Cited

U.S. PATENT DOCUMENTS

| | | | |
|---|---|---|---|
| 6,449,624 B1 * | 9/2002 | Hammack et al. | 707/999.1 |
| 6,687,734 B1 * | 2/2004 | Sellink et al. | 709/203 |
| 6,725,367 B2 * | 4/2004 | Morrison et al. | 713/1 |
| 7,071,934 B1 * | 7/2006 | Faoro et al. | 715/229 |
| 7,318,094 B1 * | 1/2008 | Kirti et al. | 709/223 |
| 7,320,009 B1 * | 1/2008 | Srivastava et al. | 707/625 |
| 2004/0177343 A1 * | 9/2004 | McVoy et al. | 717/122 |
| 2004/0268233 A1 * | 12/2004 | Okumura et al. | 715/513 |
| 2006/0059116 A1 * | 3/2006 | Levi et al. | 707/1 |
| 2006/0120627 A1 * | 6/2006 | Shiiyama | 382/305 |
| 2007/0260651 A1 * | 11/2007 | Pedersen | 707/204 |
| 2008/0235357 A1 * | 9/2008 | Gustafsson | 709/220 |

* cited by examiner

*Primary Examiner* — Rehana Perveen
*Assistant Examiner* — Tiffany Thuy Bui
(74) *Attorney, Agent, or Firm* — Robert M. McDermott (57) ABSTRACT

A scalable comparison structure and methodology is provided that is suitable for comparing select data content in hundreds or thousands of files in an efficient manner. Section delimiters are defined to identify the sections of the files within which the select data content is located, and sets of unique sections are identified based on the select data content within the section. Thereafter, comparisons and reports are based on these unique content sections. If multiple files include a common set of data, a single unique content section is used to represent these multiple files. File groups are optionally defined, and different sets of select data content can be compared based on these file groups. The result of the comparison is presented in multiple hierarchical forms, including an identification of which files are different from each other, and an identification of the differences among the unique content segments.

32 Claims, 7 Drawing Sheets

```
<Sections>
   <Section name = "SNMP">                                    310
      <StartRegEx>^snmp-server</StartRegEx>
      <EndRegEx>^\n(?=^!\s*[\r\n])</EndRegEx>
      <CommandIncludeRegEx>^snmp-server\s+community</CommandIncludeRegEx>
      <CommandIncludeRegEx>^snmp-server\s+host</CommandIncludeRegEx>
      <CommandExcludeRegEx>^snmp-server\s+host\s+192\.168\.50\.254</
CommandExcludeRegEx>
   </Section>
                                                              315
   <Section name = "ISIS">
      <StartRegEx>^router\s+isis\s+core</StartRegEx>
      <EndRegEx>^\n(?=^!\s*[\r\n])</EndRegEx>
   </Section>
                                                              320
   <Section name = "Tunnels">
      <StartRegEx>^interface\s+Tunnel</StartRegEx>
      <EndRegEx>^\n(?=^!\s*[\r\n])</EndRegEx>
      <SectionIncludeRegEx>^\s+no\s+clns\s+route-cache</SectionIncludeRegEx>
      <SectionExcludeRegEx>^\s+tunnel\s+destination\s+10\.10\.1\.20</
SectionExcludeRegEx>
   </Section>
</Sections>
```

FIG. 3A

```
<DeviceGroups>
      <DeviceGroup name = "T01 Routers">              330
            <IncludeRegEx>^hostname.*T01</IncludeRegEx>
            <ExcludeRegEx>^hostname.*XT01</ExcludeRegEx>
      </DeviceGroup>
                                                       335
      <DeviceGroup name = "Px Routers">
            <IncludeRegEx>^hostname\s+P\d</IncludeRegEx>
      </DeviceGroup>
                                                       340
      <DeviceGroup name = "PEx Routers">
            <IncludeRegEx>^hostname\s+PE</IncludeRegEx>
      </DeviceGroup>
</DeviceGroups>
```

FIG. 3B

```
<DeviceGroupClasses>
    <DeviceGroupClass name = "Tier-1 Configuration">          ⎯ 350
        <ConsiderGroups>              ⎯ 351
            <ConsiderGroup>T01 Routers</ConsiderGroup>
            <ConsiderGroup>Px Routers</ConsiderGroup>
        </ConsiderGroups>        ⎯ 352
        <TestSections>       ⎯ 353
            <TestSection>SNMP</TestSection>
            <TestSection>Tunnels</TestSection>
        </TestSections>       ⎯ 354
    </DeviceGroupClass>

<DeviceGroupClass name = "Tier-2 Configuration">          ⎯ 360
        <ConsiderGroups>
            <ConsiderGroup>PEx Routers</ConsiderGroup>
        </ConsiderGroups>
        <TestSections>
            <TestSection>ISIS</TestSection>
            <TestSection>Tunnels</TestSection>
        </TestSections>
    </DeviceGroupClass>
</DeviceGroupClasses>
```

| Group T01 Routers | | | |
|---|---|---|---|
| Class | Section | Differences | Details |
| Tier-1 Configuration | SNMP | Yes | <link1> |
| | Tunnels | N/A | <link2> |

| Group Px Routers | | | |
|---|---|---|---|
| Class | Section | Differences | Details |
| Tier-1 Configuration | SNMP | Yes | <link3> |
| | Tunnels | No | <link4> |

| Group PEx Routers | | | |
|---|---|---|---|
| Class | Section | Differences | Details |
| Tier-2 Configuration | ISIS | Yes | <link5> |
| | Tunnels | Yes | <link6> |

FIG. 5A

| Section SNMP | | |
|---|---|---|
| Unique Section | Present on | Absent from |
| T01Routers.SNMP(1) | NYT01, CAT01, SFT01, IAT01, MIT01 | NJT01, LAT01, CHT01 |
| T01Routers.SNMP(2) | NJT01, CHT01 | NYT01, CAT01, SFT01, IAT01, MIT01, LAT01 |
| T01Routers.SNMP(3) | LAT01 | NYT01, NJT01, CAT01, SFT01, IAT01, MIT01, CHT01 |

FIG. 5B

Device Group Class: Tier-1 Configuration

Device Group: T01 Routers

Config Section Type: SNMP

| Unique Section | Present on | Absent from |
|---|---|---|
| T01Routers.SNMP(1) | NYT01, CAT01, SFT01, IAT01, MIT01 | NJT01, LAT01, CHT01 |
| T01Routers.SNMP(2) | NJT01, CHT01 | NYT01, CAT01, SFT01, IAT01, MIT01, LAT01 |
| T01Routers.SNMP(3) | LAT01 | NYT01, NJT01, CAT01, SFT01, IAT01, more |

Config Section Type: Tunnel

| No Tunnels found |
|---|

Device Group: Px Routers

Config Section Type: SNMP

| Unique Section | Present on | Absent from |
|---|---|---|
| Px Routers.SNMP(1) | P1, P3, P5, P6, P7, P9 | P2, P4, P8 |
| Px Routers.SNMP(2) | P2, P4, P8 | P1, P3, P5, P6, P7, P9 |

Config Section Type: Tunnel

| Unique Section | Present on | Absent from |
|---|---|---|
| Px Routers.Tunnel(1) | ALL | |

Device Group Class: Tier-2 Configuration

Device Group: PE Routers

Config Section Type: ISIS

| Unique Section | Present on | Absent from |
|---|---|---|
| PEx Routers.ISIS(1) | PE1, PE2 | PE3 |
| PEx Routers.ISIS(2) | PE3 | PE1, PE2 |

Config Section Type: Tunnel

| Unique Section | Present on | Absent from |
|---|---|---|
| PEx Routers.Tunnel(1) | PE1, PE2 | PE3 |
| PEx Routers.Tunnel(2) | PE3 | PE1, PE2 |

FIG. 5C

| Device Group Class | Device Group | Config Section Type | Identical | Unique Sections |
|---|---|---|---|---|
| Tier-1 Configuration | T01 Routers (8) | SNMP | - | 3 |
| | | Tunnels | - | - |
| | Px Routers (9) | SNMP | - | 2 |
| | | Tunnels | 9 | 1 |
| Tier-2 Configuration | PEx Routers (3) | ISIS | - | 2 |
| | | Tunnels | - | 2 |

FIG. 5D

Device Group Class: Tier-2 Configuration
Device Group: PEx Routers
Config Section: ISIS

Specification:
    Start RegEx ^router\s+isis\s+core
    End RegEx ^\n(?=^!\s*[\r\n])
    Section Include RegEx: none
    Section Exclude RegEx: none
    Command Include RegEx: none
    Command Include RegEx: none Unique Sections matching the Specification:
    Section PExRouters.ISIS(1)
        router isis core
        net 49.0001.0100.1000.1010.00
        metric-style wide
        passive interface Loopback()
        mpls traffic-eng router-id Loopback()
        mpls traffic-eng level-2

Section PExRouters.ISIS(2)
        router isis core
        net 49.0002.0100.1000.1020.00
        metric-style wide
        passive interface Loopback()
        mpls traffic-eng level-2

FIG. 5E

| Device Group Class: Tier-2 Configuration<br>Device Group: PEx Routers (3)<br>Config Section: ISIS | | |
|---|---|---|
| Entry | ISIS(1) | ISIS(2) |
| metric-style wide | 3 | 3 |
| mpls traffic-eng router-id Loopback() | 5 | - |
| mpls traffic-eng level-2 | 6 | 5 |
| net 49.0001.0100.1000.1010.00 | 2 | - |
| net 49.0002.0100.1000.1020.00 | - | 2 |
| passive interface Loopback() | 4 | 4 |
| router isis core | 1 | 1 |

FIG. 5F

VERIFYING DATA CONSISTENCY AMONG STRUCTURED FILES

This application claims the benefit of U.S. Provisional Patent Application 60/968,013, filed 24 Aug. 2007.

BACKGROUND AND SUMMARY OF THE INVENTION

This invention relates to the field of data processing, and in particular to a method and system for comparing the content of multiple files. Such a method and system is particularly well suited for comparing configuration files that are associated with devices on a communications network, to verify data consistency among the devices.

In many systems, common data is expected to be associated with multiple elements of the system. In a conventional database system, for example, individual data sets would include references to the particular items of common data, so that when any common data item is changed, the change is automatically reflected in each of the data sets that reference this common data item. In a distributed system, common data can be similarly referenced by each remote element of the system, but such an approach would be extremely vulnerable to a single point of failure that affects access to the common data by the remote elements.

To assure reliability in a distributed system, a copy of the common data is generally maintained at each remote element of the system. Such distribution, however, introduces the possibility of different versions of the common data being present at different remote elements. Additionally, in many cases, the remote elements of a distributed system are not homogeneous, per se, and the form of the common data at different elements of a distributed system may often differ, increasing the likelihood of differences appearing at each element. In like manner, not all remote elements will necessarily share the same items of common data, and some elements may purposely be designed to use locally defined items in lieu of some of the items of common data.

A communication system comprising a network of devices is a particular example of a distributed system of non-homogenous elements that access data items that are expected to be common among at least a subset of the elements. For example, if TCP services are to be provided on a given network, all of the files that are used to configure the routers of the network would be expected to include a "TCP Services" entry. This particular entry may differ in format among different router vendors, and may appear at different locations within each particular configuration file.

For ease of reference and understanding, the collection of data at a remote element of a distributed system is herein defined to be located in a 'file', although one of skill in the art will recognize that this term refers to the logical arrangement of data, and such 'files' may be maintained in a variety of physical forms, including, for example, a data collection on multiple devices of the remote element. In like manner, the aforementioned term 'distributed system' refers to a logical distribution of elements, independent of the physical arrangement of such elements. Using this terminology, in a distributed system comprising multiple elements, each element possesses one or more files that contain data items, some of which data items are assumed to be common among all or some of the elements.

Conventional file comparators are generally unsuitable for comparing a large number of files. A typical file comparator compares two files and highlights the differences between the files based on a comparison of the text. Some file comparators are able to compare three files, using different methods of highlighting for each of the types of differences. For example, with three files, A, B, C, there are six different types of differences among the files: in A, but not in B or C; in A and B, but not in C; not in A or C, but in B; and so on. Comparing four or more files quickly becomes infeasible using conventional text based comparators.

In like manner, conventional file comparators are generally unsuitable for comparing files that have many non-common data items, because differences among the items that are expected to be common are not easily distinguishable from the different non-common data items. And, if the common data items are different only in form, such differences are also not distinguishable from the substantive differences among the common data items.

It would be advantageous to provide a means for comparing particular data items or sets of data items in multiple files to identify differences among the files. It would also be advantageous to provide a user interface that allows a user to formulate the comparison task easily and efficiently. It would also be advantageous to provide an output scheme that presents the detected differences in a substantively meaningful and understandable form.

These advantages, and others, can be realized by providing a scalable comparison structure and methodology that is suitable for comparing select data content in hundreds or thousands of files in an efficient manner. Section delimiters are defined to identify the sections of the files within which the select data content is located, and sets of unique sections are identified based on the select data content within the section. Thereafter, comparisons and reports are based on these unique content sections. If multiple files include a common set of data, a single unique content section is used to represent these multiple files. File groups are optionally defined, and different sets of select data content can be compared based on these file groups. The result of the comparison is presented in multiple hierarchical forms, including an identification of which files are different from each other, and an identification of the differences among the unique content segments.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention is premised on the observation that data files in a distributed system are typically well structured, and a file comparator that takes advantage of such structure will be substantially more efficient and effective than a conventional general purpose file comparator. This invention is also premised on the observation that the comparison of data files in a distributed system is often a targeted search for differences among select data items that are expected to be common among multiple files. One of skill in the art will recognize, however, that although the techniques presented herein are particularly well suited for these situations, these techniques are not necessarily limited to distributed systems, well structured files, or data items that are expected to be common.

The invention is presented using the paradigm of a communication system comprising a network of devices, each device being configured for operation on the network based on data items in a corresponding configuration file. Device configuration files generally contain data items that are unique to the particular device, and data items that are common to particular sets of devices, including the set of all devices on the network, or all similar device types on the network. Although the application of the principles of this invention are particularly well suited for comparing network configuration files, one of skill in the art will recognize that this invention is not limited to this particular application. In like manner, network configuration data may have particular relationships, limits, and constraints, whereas such characteristics are not, per se, characteristics of this invention.

Network devices typically perform a variety of tasks or functions, each of which generally having one or more parameters that are set to effect different aspects of the task or function. To determine which parameter sets are being initialized by each entry in a device's configuration file, the configuration file is often structured so as to identify the particular task or function, followed by an identification and value(s) for each parameter set that is to be modified, and concluded with an identifier of the end of the list of parameter sets. In some cases, these sets of function-parameter(s)-end sets are nested within other function-parameter(s)-end sets in a hierarchical manner. In other cases, the parameter sets for a particular task or function are each independently specified, wherein, for example, the identification of the particular task or function is included at the beginning of each configuration phrase, followed by an identifier and value(s) of the parameter set, and an end-of-line or other symbol indicating the end of the phrase. Generally, each of these independent parameter sets appear contiguously in the configuration file, however the physical location of each parameter set is immaterial to the collection of such parameter sets that form a logical 'section' of the configuration file associated with the particular task or function.

For example, in a typical communications network, most devices will include SNMP (Simple Network Management Protocol) capabilities that allow a remote monitoring system to query each device regarding its current status. Configuration information for SNMP services includes, for example, an identification of the SNMP community access string/password, an identification of one or more SNMP groups and their viewing rights to data within the device, the version(s) of SNMP supported by the device, and so on. To identify SNMP configuration information, the configuration phrase is initiated with the SNMP identifier, followed by the parameter set identifier, followed by the parameter value(s), as in:

snmp-server community string view view-name ro.

In this example, "snmp-server" identifies the phrase as being an SNMP configuration entry; "community" identifies the phrase as defining access control for a community; string is the particular value of the access control password; "view" identifies the phrase as defining which views (types) of SNMP data are controlled by this access control; view-name is the particular view for which access is granted; and "ro" identifies the access as read-only.

In the above example, an "SNMP" section of a file can be defined as the collection of all configuration phrases that begin with "snmp-server", regardless of where these phrases appear in the configuration file. In like manner a section can be defined as the collection of all the configuration files that begin with "snmp-server" except those associated with particular parameters that are of no interest to the user. Similarly, a section can be defined as the collection of the configuration files that begin with "snmp-server" and are associated with the particular parameters that are of interest to the user. For example, for assuring proper SNMP monitoring within a network, the community password should generally be common among all of the monitored device, and thus comparing this parameter among devices would be of interest to a network manager. Conversely, a configuration phrase that provides a device identifier or device location would be expected to differ among the devices, and would not be of interest for comparison purposes. One of skill in the art will recognize that any of a variety of rules can be provided to include or exclude particular types of configuration phrases within the defined section to facilitate meaningful and efficient comparisons among device configuration files.

Figures 1, 2A, 2B:
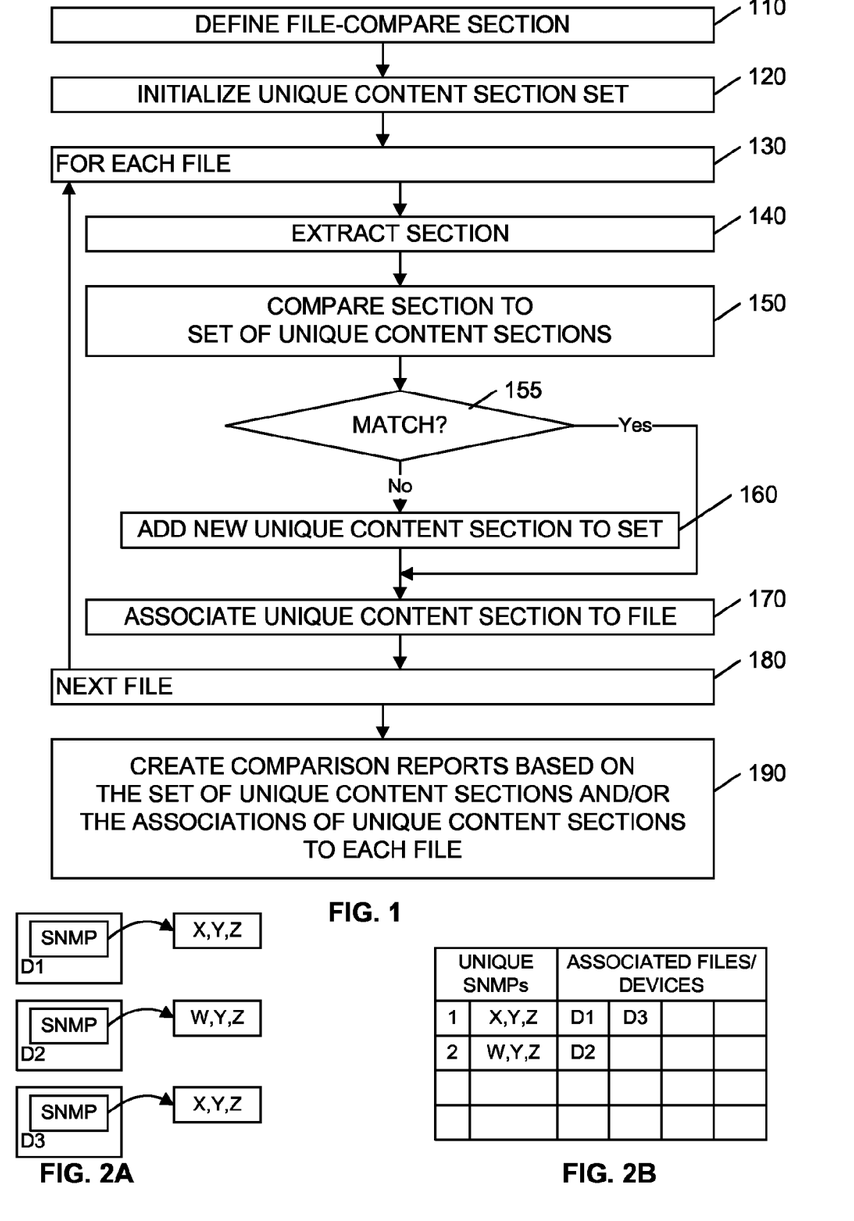
FIG. 1 illustrates an example flow diagram for creating an example structured comparator in accordance with this invention.
FIG. 2A-2B illustrates an example comparison of a select section among three devices using the techniques of this invention.

FIG. 1 illustrates an example flow diagram for comparing elements of a defined section from among multiple files. At 110, the elements forming the section that is to be compared among the files are defined. As discussed above, any of a variety of identifiers can be used to include or exclude elements of a file for selection as members of the section. For example, {"snmp-server" but not "device-id"} can be used as a section selection identifier to select all configuration phrases that include "snmp-server" except those that also include "device-id"; {"snmp-server" and "community"} can be used as a section selection identifier to select all configuration phrases that include both "snmp-server" and "community". In a preferred embodiment, a structured form for defining sections is used to reduce the likelihood of erroneous selections or non-selections, as detailed further below.

At 120, a set of unique content sections is initialized, typically to either a null set or a default set. As detailed below, the section of each file will be classified as being equivalent to one of the sections of this (expandable) set of unique content sections, based on the particular content of the section of the file. The set of unique content sections can be initialized, for example, to include a section that contains the expected content of the section in all or most of the files. In the example of a network configuration comparison system, the default set could be a defined section that includes the expected configuration of each of the parameter sets of interest. In like manner, the set of unique content sections can include a set of defined sections that include different allowable configurations of the parameter sets of interest.

The loop 130-180 processes each file to compare the content of the defined section among the multiple files. At 140, the section of the current file is extracted; as noted above, this (logical) section can be independent of the physical arrangement of elements in the file, the section being defined by the one or more section selection identifiers, at 110.

At 150, the section extracted from the current file is compared to each section of the set of unique content sections until a match is found, if any. In most cases, this comparison is performed independent of the order in which the content appears in the section. However, in a preferred embodiment, a difference in the order of particular elements of the section can be specified as constituting a non-match between the sections.

The method of comparison and criteria used for declaring a match can be customized, depending upon the nature of the comparison task. Absent any information to the contrary, a literal match of each parameter value is required to declare a match. In systems designed for a particular comparison application, context-based comparisons can be used, wherein knowledge of the particular use or function of a given parameter set can provide for a more reasoned match determination, as compared to requiring a literal match. In a customizable embodiment, the user may be provided the option of defining criteria for comparing particular parameter values, such as giving a range of tolerances (e.g. ±10%) for determining matches among numeric parameters, allowing synonyms for text parameters, and so on. In a fully controllable comparison system, the user may be provided the option of providing a software function that receives as input the content of each section to be compared, and returns a 'match' or 'no-match' determination, thereby providing unlimited flexibility in defining the method and criteria for performing this comparison. In like manner, the user may be provided the option to define a software function that receives as input a particular parameter set and its value(s) for each of the two sections to be compared, and return a 'match' or 'no-match' determination for that parameter set. These and other techniques for providing comparison techniques beyond literal matching will be evident to one of skill in the art in view of this disclosure.

If, at 155, a match is found between the section of the current file and one of the unique content sections, an association is established between that unique content section and the current file, at 170. If, at 155, a match is not found, the content of the section of the current file must be unique, and is therefore added to the set of unique content sections, to which sections of subsequent files will be compared, at 150. An association is also established between this newly added unique content section and the current file, at 170.

After all of the sections of the files are compared and all files are correspondingly associated with a unique content section, any of a variety of reports can be generated based on the unique identifiers and/or the association of files to these unique identifiers, at 190, as detailed further below.

FIGS. 2A and 2B illustrate an example comparison of an SNMP configuration among three devices D1, D2, D3 using the techniques of this invention.

In FIG. 2A, each of the devices D1, D2, and D3 are illustrated as having an SNMP configuration section, the definition of the elements of this configuration section being defined by one or more section selection identifiers, as discussed above. The extraction of the defined SNMP configuration section from device D1 provides elements X, Y, and Z; the extraction from D2 provides elements of W, Y, and Z; and the extraction from D3 provides elements X, Y, and Z.

As illustrated in FIG. 2B, the extraction of the SNMP configuration from devices D1 and D2 will produce two unique content sections. The first unique section includes elements X, Y, and Z; the second unique section includes elements W, Y, and Z. When the contents of the extracted configuration from device D3 is compared to the first unique section, a match is determined, and device D3 is associated with the first unique section.

Of particular note, once a match to a unique content segment is determined, the configuration of D3 does not need to be compared to the configuration of any other section, because the unique content sections are defined/created to be unique. Thus, for example, D3 does not need to be compared with D1 or D2, because being associated with a unique content section automatically determines D3's status relative to all other devices: it's configuration matches all devices that are associated with the first unique content section, and is different from all devices that are associated with any of the other unique content sections. Although this savings may not appear significant in this three-device example, consider the savings realized when a hundredth device is found to match a unique content section. In a conventional comparison system, the hundredth device would need to be compared with each and every one of the first ninety-nine devices; in this invention, it need only be compared to the unique content sections, and only until a match is found. As will be evident to one of skill in the art, this technique easily allows for the comparison of thousands of devices, because, if the defined sections for comparison are expected to generally contain the same information, the number of unique content sections will grow much more slowly than the number of devices being compared.

Given the above described technique that allows for an efficient comparison of hundreds or thousands of files, a number of enhancements can be included to facilitate the efficient collection of data and subsequent reporting of the results of the comparisons. Such enhancements may be of a general nature, while others may be specific to the particular application for which the comparison system is designed, such as the example comparison system of this disclosure that is designed for comparing network configuration data.

Most network comparison tasks are targeted to particular devices or device types, and it would be advantageous to provide a scheme for efficiently identifying which devices/files to include or exclude from the comparison process of FIG. 1. For example, a comparison may be targeted to only the routers on the network, or only the firewalls on the network, and so on. Similarly, the comparison may be targeted to only the routers of a particular class, or at a particular location, and so on.

It is often desirable to compare different sections of configuration data for different types or classes of devices, or for different comparison tasks applied to the same device or device class. That is, for example, a comparison task may include a comparison of the SNMP configuration among all routers, a comparison of TCP configuration among routers of a first and second class of routers, a comparison of Anti-Spoofing configurations among routers of the first class and a third class, and so on.

To allow for a flexible and efficient means for managing targeted comparison tasks among multiple types of devices, the concepts of "Device Group" and "Device Group Class" are used to define membership in test/comparison groups. A device group is, as the name implies, an identified group of devices; a device group class is a set of device groups for which the same set of comparisons is to be applied. In a preferred embodiment, a user identifies each defined device group by name, and each defined compare-section by name. Then, the device group class is defined along the lines of: "For groups A, B, and D, test sections S1 and S3." In this definition, each test section is applied to each group independently. Different device group classes can be defined, and any group or section may be included in multiple device group classes.

Figure 3A:
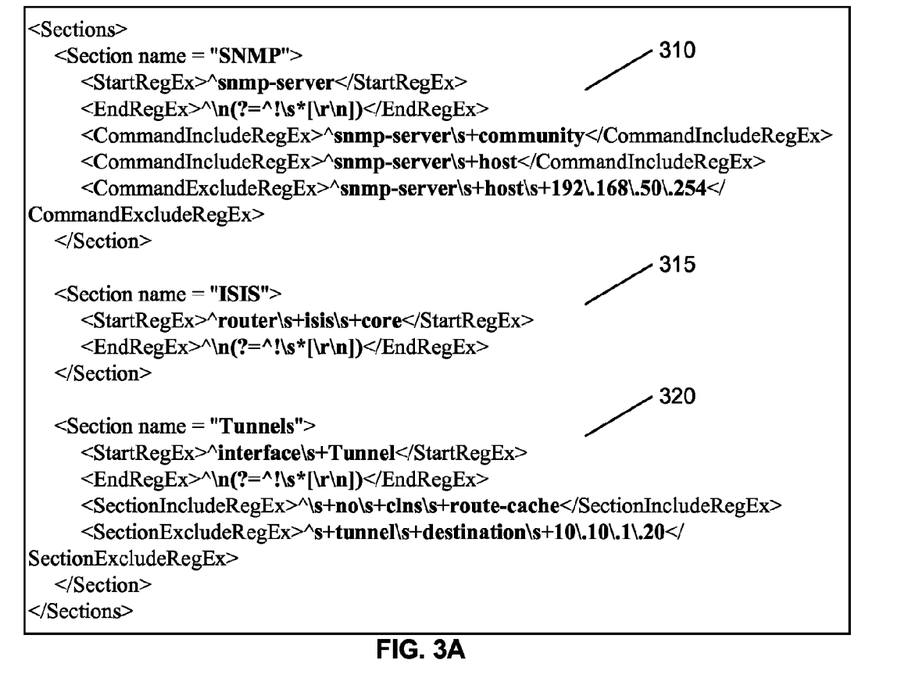
FIGS. 3A-3C illustrate an example set of XML-like structures that facilitate defining a network comparison task
Figure 3B:
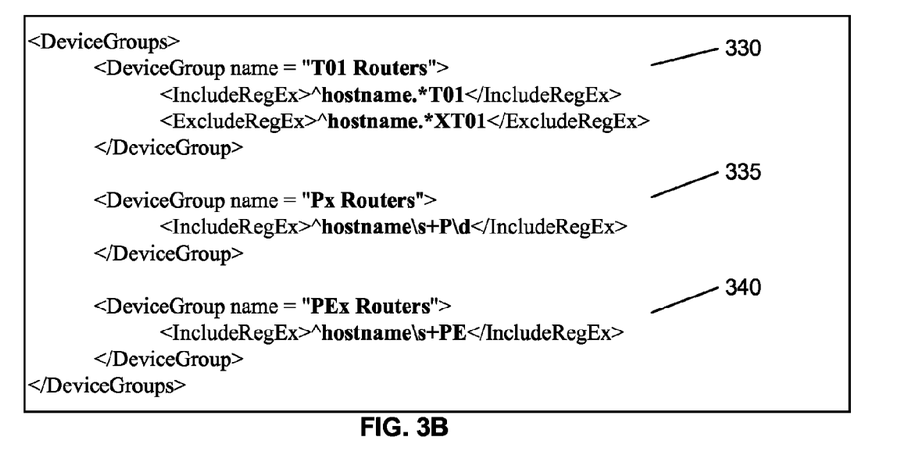
Figure 3C:
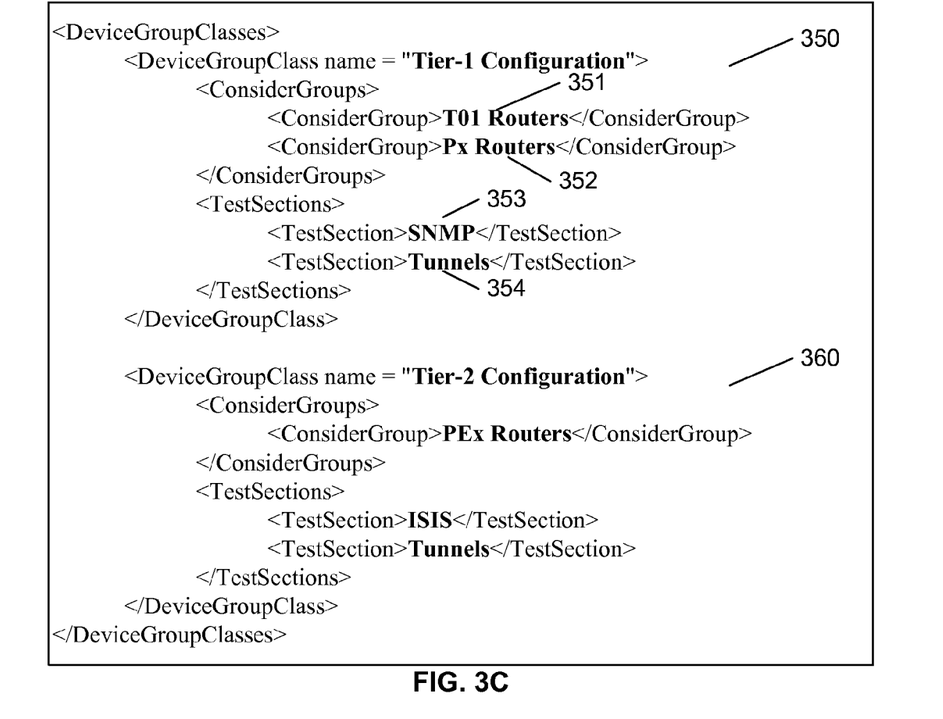

FIGS. 3A-3C illustrates an example specification of sections, groups, and classes using an XML-like format.

FIG. 3A illustrates an example XML-like specification of sections that are to be available for comparison if included in a device group class. In this example specification, three comparison sections are defined: "SNMP" 310, "ISIS" 315, and "Tunnels" 320. As discussed above, the definition of each section includes a specification for identifying a beginning (StartRegEx) and end (EndRegEx) of elements that are associated with the particular section. In this example, elements of the SNMP section begin with "snmp-server"; elements of the ISIS section begin with "router isis core"; and elements of the Tunnels section begin with "interface Tunnel". The end of each example element is identified by a blank line.

If no further entries are specified, as in the ISIS section definition 315, all elements that are consistent with the section beginning and end specification will be included in the comparison. Alternatively, the section definition may specify particular elements to include or exclude. In the SNMP section 310, only elements that include "community" or "host" will be included, except those that include "host" and "192.168.50.254".

FIG. 3B illustrates an example XML-like specification of device groups that are to be available for comparison if included in a device group class. In this example, three device groups are defined: "T01Routers" 330, "Px Routers" 335, and "PEx Routers" 340. The definition of each device group specifies which devices to include, and, from within that inclusion, which devices to exclude. For example, the group T01Routers 330 will include all devices with a hostname that ends with "T01", except those that end with "XT01".

FIG. 3C illustrates an example XML-like specification for device group classes. As discussed above, each device group class serves to identify which devices are to have which sections compared. In this example, two device group classes are defined: "Tier-1 Configuration" 350 and "Tier-2 Configuration" 360. The Tier-1 Configuration 350 specifies that devices in groups T01 Routers 351 and Px Routers 352 are to be 'tested' by comparing sections SNMP 353 and Tunnels 354 in the configuration file for each device. The Tier-2 Configuration 360 specifies that devices in group PEx Routers are to be tested by comparing sections ISIS and Tunnels.

These device group classes are processed to identify which device configuration files to compare, and which set of sections in each file needs to be compared. As detailed above, each section comparison is performed by comparing the section of each file to a set of unique content sections, and an association is defined between the file and each of its unique content sections. Thereafter, the results of the comparison tasks as defined by the device group classes are presented based on these associations to the unique content sections.

Figure 4:
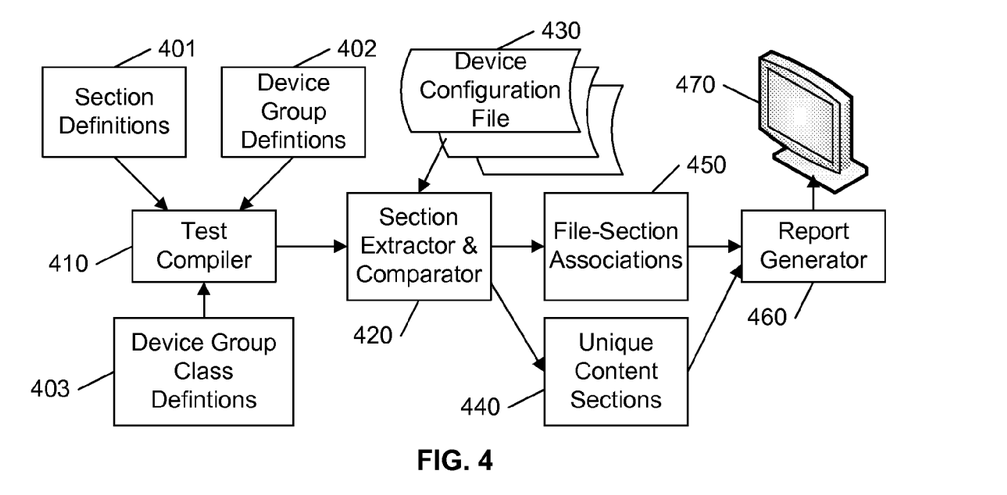
FIG. 4 illustrates an example block diagram of a structured comparator in accordance with this invention.

FIG. 4 illustrates an example block diagram of a network configuration verification system in accordance with this invention.

A test compiler 410 is configured to process section definitions 401, device group definitions 402, and device group class definitions 403 to provide a set of comparison tasks for the section extractor and comparator 420 to perform. As noted above, the device group and device group classes are optional, but have been found to be particularly effective for defining well targeted comparisons that minimize the reporting of immaterial or extraneous differences.

The section extractor and comparator 420 extracts the pertinent sections from the configuration file 430 of each of the devices being tested/compared. A set of unique content sections 440 is created by comparing each extracted section with the current set of unique content sections for the particular section being compared, and adding the extracted section to the set only if it does not match one of the existing unique content sections. When a match is found, or when the extracted section of a file is added to the set of unique content sections, the file is associated 450 with the matching/added unique content section.

Given the set of file-section associations for all of the files being compared, and the sets of unique content sections for each associated section, a report generator 460 presents the results of the comparison tasks to a user, typically via an interactive interface 470, as detailed below.

Any of a number of reports may be provided based on the unique sections that are included in each file of each group. Such reports include reports that provide summary information, such as the number of files associated with each of the most popular unique content sections, as well as reports that include verifications, such as an identification of each file that differs from a unique content section that represents an expected/required configuration, as well as reports that identify how each device in each group is configured for each of the tested sections. Of particular note, in a preferred embodiment, only the particular sections of the devices within each device group class are included in the reports. That is, for example, two devices may have differences in a particular section, but only if the two devices appear in a defined device group class, and that particular section is included in this defined group class, will the differences be reported. In this manner, the amount of extraneous and/or immaterial information that is included in the comparison reports is minimized.

The following paragraphs describe some preferred output reports, although one of skill in the art will recognize that other reports that are based on the determined unique content sections, and the association between each device configuration file and these determined unique content sections can be created as well.

Figure 5A:
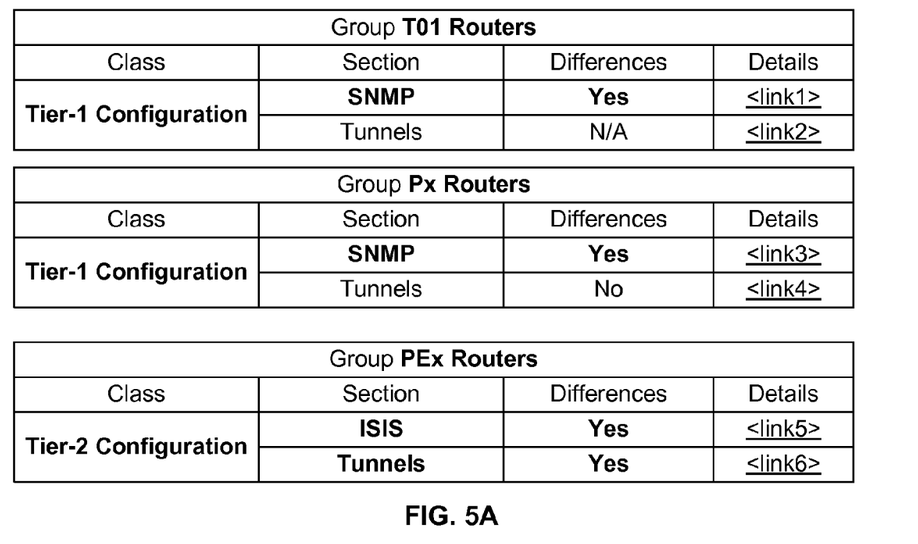
FIGS. 5A-5F illustrate an example set of outputs of the example structured comparator of this invention.

FIG. 5A illustrates an example verification summary report that identifies the results of the comparison of the sections specified in the example device group classes of FIG. 3C. In this example, the report is partitioned by device groups (T01 Routers, Px Routers, PEx Routers). For each device group, each device group class to which the device group belongs is listed. In this example, each device group only appears in one device group class. For each device group class, the tested sections are listed with an indication of whether the section in the devices of the device group exhibited any differences.

Within the T01 Routers group, the SNMP section differed among the routers in the group; the "N/A" entry under the Differences column indicates that no Tunnels were found in the group of T01 Routers. Within the Px Routers group, the SNMP section differed among the routers in the group, but the Tunnel section of all of the routers in the group showed no differences. Within the PEx Routers group, both the ISIS and Tunnel sections exhibited differences among the devices in that group.

The Details column provides a hyper-link for each section to allow a user to "drill-down" to obtain further details. For example, selecting the <link1> entry in the T01 Routers SNMP section may provide details as illustrated in FIG. 5B.

Figure 5B:
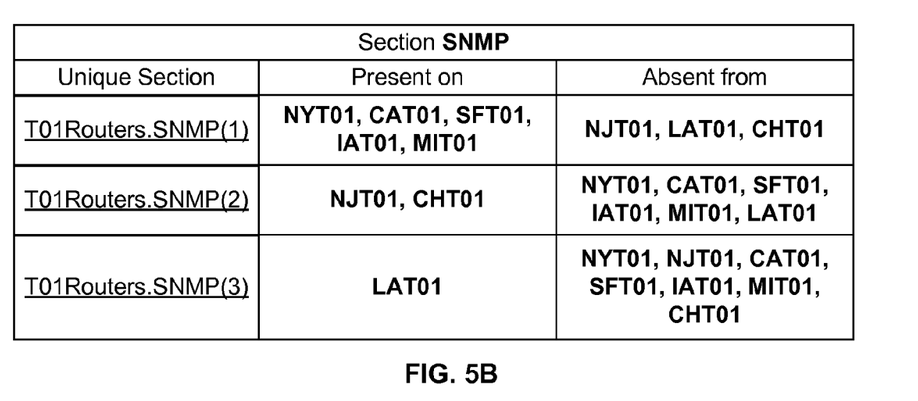

In FIG. 5B, the SNMP section for the T01 Routers indicates that three unique content segments (T01 Routers.SNMP(1), T01 Routers.SNMP(2), T01 Routers.SNMP(3))

were discovered among the devices in the T01 Routers group. The first unique content segment T01Routers.SNMP(1) is present in each of the listed devices NYT01, CAT01, SFT01, IAT01, and MIT01, and absent from the devices NJT01, LAT01, and CHT01. The devices in which the second and third content segments are present and absent are similarly listed. As indicated by the underlined section names, these are hyperlinks for obtaining the details of each of the unique content segments.

Figure 5C:
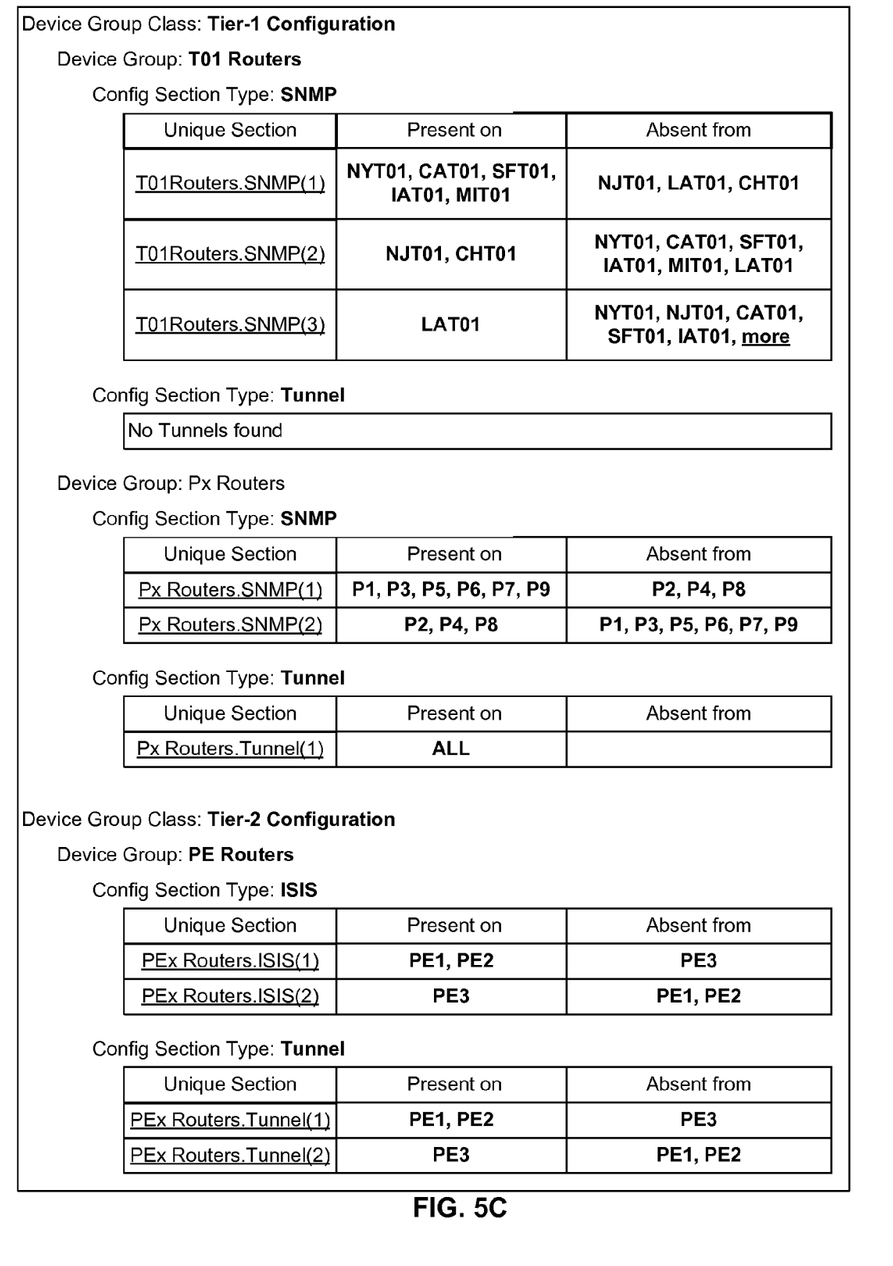

In addition to allowing a user to obtain details by drilling down, the preferred system also provides a consolidated view at more detail than that of FIG. 5A. FIG. 5C illustrates an example consolidated view that uses indentation to display the hierarchical nature of the section comparisons.

FIG. 5C presents the comparison results partitioned in the hierarchical order of Device Group Class, Device Group, and Section. The display of the section data is as discussed with regard to FIG. 5B. Note that the unique content sections are presented as a function of the device group. That is, one or more unique content sections identified in the SNMP section of the T01Routers may match one or more of the unique content sections identified in the Px Routers device group, but the comparisons, and hence the unique content sections, are specific to each device group.

Figure 5D:
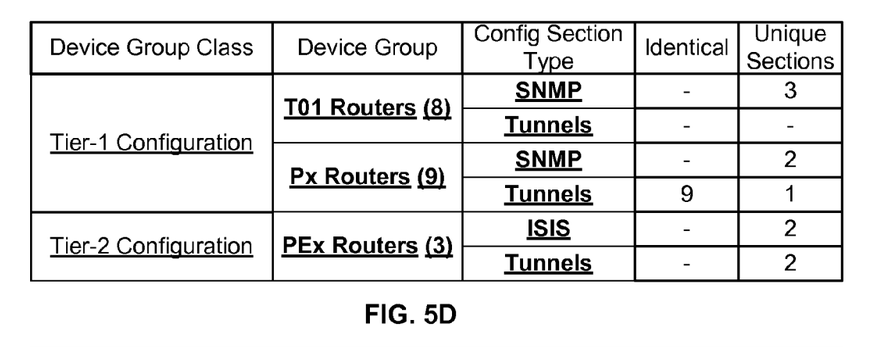

FIG. 5D illustrates another example summary report, also organized by the hierarchical order of Device Group Class, Device Group, and Section. In this presentation, the number of unique content segments within each configuration section of each device group within each device group class is identified. If only one unique content section for a given section is found, then all of the devices in this section must share this common content, and the number of these identically configured devices (for this section) is displayed.

The underlined entries in FIG. 5D indicate hyper-links that provide additional details. Selecting a device group name or section name produces a display of the defined characteristics (FIGS. 3A and 3B) of the section or group. Selecting the number (of devices) within a device group produces a display of all of the devices that satisfied the defined characteristics of the group. That is, for example selecting the (8) entry for the T01 Routers group provides a display of the eight routers having a host name that ends in "T01" as specified in FIG. 3B.

Figure 5E:
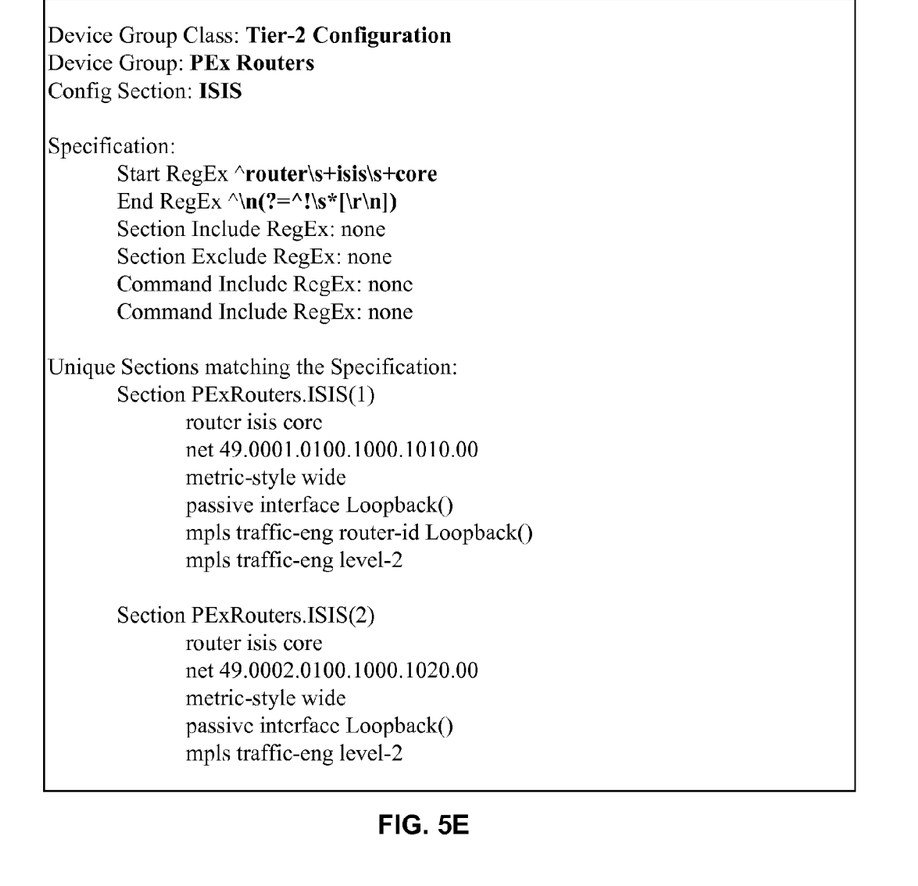

Selecting a particular Configuration Section Type in FIG. 5D provides the example display of FIG. 5E. In FIG. 5E, the specification of the selected section is presented in a more readable form than the input format for this specification in FIG. 3A, and details of each of the unique content sections that match this specification are illustrated. In this example, the two unique content sections differ in the content of the "net" parameter, and the absence of a "mpls traffic-eng router-id" entry in the second unique content section.

Figure 5F:
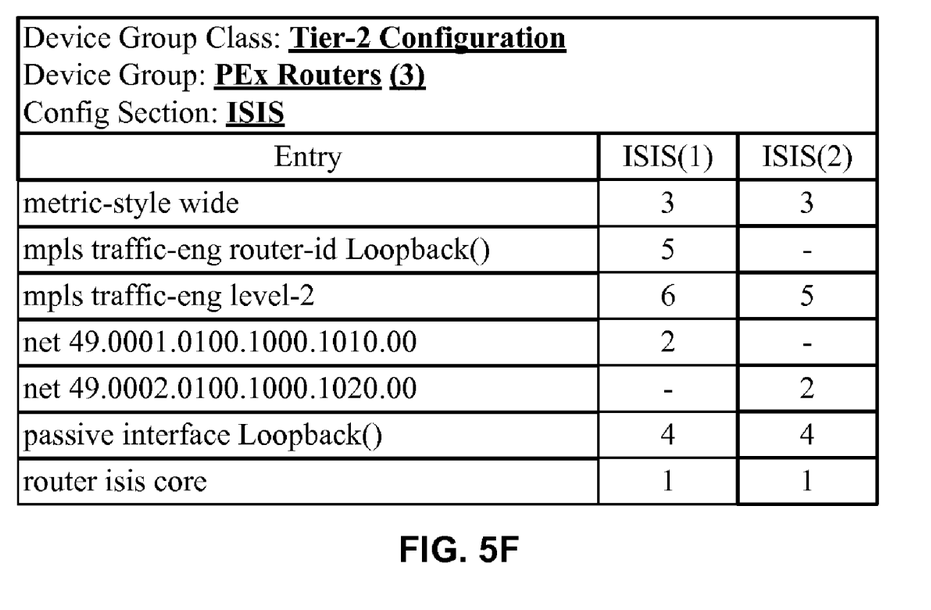

To facilitate the identification of the specific difference among the unique content segments, FIG. 5F illustrates an example detailed display of the particular content found in the sections of all the devices in the group. In this example, the entries are listed in alphabetical order, although a user-specified order is also provided. The two unique content ISIS sections identified in FIG. 5E form two columns in this presentation; if more unique content sections were found, additional columns would be displayed, one for each unique content section.

In the example of FIG. 5F, the entry in each unique content section column indicates the order in which the given entry appears in the section, assuming that the order of statements is relevant to the comparison. If the order of the statements is immaterial to the comparison tasks, these numerical entries are replaced by a 'check' or 'x' symbol, indicating that the entry is present somewhere in the section.

Of particular note, each of the various displays of FIGS. 5A-5F is created based on the unique content sections and the associations of the device configuration files to these unique content sections. Also of particular note, as compared to an exhaustive comparison of each configuration file with each and every other configuration file, no information is lost via the use of these unique content sections and associations for the parameters of interest in each section.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A method for comparing a plurality of files, comprising:
identifying, at a data processing device, a section of each file of the plurality of files based on one or more section selection identifiers,
defining, by the data processing device, a set of unique content sections among the plurality of files based on a comparison of content of each of the sections of the plurality of files,
creating an association between each of the unique content sections and one or more of the files that include a section corresponding to the unique content section, and
creating, by the data processing device, one or more comparison reports based on the content of, and the files associated with, one or more of the unique content sections,
wherein:
at least one of the comparison reports is based on a hierarchy of information based on the set of unique content sections and
the hierarchy includes:
an identification of a group to which each file is associated,
an identification of the sections within each group, and
an identification of the unique content sections among the sections within each group.

2. The method of claim 1, wherein identifying the section of each file includes defining parameters that identify a start and end of one or more elements of the section in each file.

3. The method of claim 1, wherein defining the set of unique content sections includes:
comparing the content of the section of each file with each unique content section of the set of unique content sections, and if the content of the section does not correspond to any of the current set of unique content sections, adding the section to the set of unique content sections.

4. The method of claim 3, wherein comparing the content of the sections of each file with each unique content section is performed without regard to an order of the content.

5. The method of claim 1, wherein the plurality of files include files that identify configurations of devices of a network.

6. The method of claim 5, wherein the plurality of files correspond to a defined group of devices.

7. The method of claim 1, wherein at least one of the comparison reports is based on a count of the files that include sections corresponding to at least one of the set of unique content sections.

8. The method of claim 1, wherein at least one of the comparison reports is based on a count of unique content sections in the set of unique content sections.

9. The method of claim 1, wherein at least one of the comparison reports includes an identification of the files that include sections corresponding to at least one of the set of unique content sections.

10. The method of claim 1, wherein the hierarchy further includes an identification of the files that include sections corresponding to each of the unique content sections among the sections within each group.

11. The method of claim 1, wherein the hierarchy further includes an identification of content within each unique content section.

12. The method of claim 1, wherein membership at one or more levels of the hierarchy is based on a user supplied membership definition.

13. The method of claim 1, wherein at least one of the comparison reports includes display that illustrates the files that include sections corresponding to each of the set of unique content sections.

14. The method of claim 1, wherein at least one of the comparison reports includes display that illustrates content of the sections that are included in each of the set of unique content sections.

15. The method of claim 14, wherein at least one of the comparison reports illustrates an order of the content of the sections that are included in each of the set of unique content sections.

16. The method of claim 1, wherein the section of each file is identified based on an XML expression that is used in the file.

17. A system comprising:
a processor that is configured to embody:
a compiler that receives one or more section selection identifiers that facilitate an identification of a section of each file of a plurality of files, and
an extractor that:
determines a set of unique content sections among the plurality of files based on content of the sections of the plurality of files, and
creates, in a memory element, an association between each of the unique content sections and one or more of the files that include a section corresponding to the unique content section, and
a reporter that accesses the memory element and provides one or more comparison reports based on the content of, and the files associated with, the set of unique content sections,
wherein:
at least one of the comparison reports is based on a hierarchy of information based on the set of unique content sections, and
the hierarchy includes:
an identification of a group to which each file is associated,
an identification of the sections within each group, and
an identification of the unique content sections among the sections within each group.

18. The system of claim 17, wherein the section identifiers include parameters that identify a start and end of one or more elements of the section in each file.

19. The system of claim 17, wherein the extractor determines the set of unique content sections by:
comparing the content of the section of each file with each unique content section of the set of unique content sections, and
if the content of the section does not correspond to any of the current set of unique content sections, adding the section to the set of unique content sections.

20. The system of claim 19, wherein comparing the content of the sections of each file with each unique content section is performed without regard to an order of the content.

21. The system of claim 17, wherein the plurality of files include files that identify configurations of devices of a network.

22. The system of claim 21, wherein the plurality of files correspond to a defined group of devices.

23. The system of claim 17, wherein the reporter displays the information based on a count of the files that include sections corresponding to at least one of the set of unique content sections.

24. The system of claim 17, wherein the reporter displays the information based on a count of unique content sections in the set of unique content sections.

25. The system of claim 17, wherein at least one of the comparison reports includes an identification of the files that include sections corresponding to at least one of the set of unique content sections.

26. The system of claim 17, wherein the hierarchy further includes an identification of the files that include sections corresponding to each of the unique content sections among the sections within each group.

27. The system of claim 17, wherein the hierarchy further includes an identification of content within each unique content section.

28. The system of claim 17, wherein membership at one or more levels of the hierarchy is based on a user supplied membership definition.

29. The system of claim 17, wherein the reporter displays information that illustrates the files that include sections corresponding to each of the set of unique content sections.

30. The system of claim 17, wherein the reporter displays information that illustrates content of the sections that are included in each of the set of unique content sections.

31. The system of claim 30, wherein at least one of the comparison reports illustrates an order of the content of the sections that are included in each of the set of unique content sections.

32. The system of claim 17, wherein the compiler identifies the section of each file based on one or more XML expressions.

* * * * *